United States Patent
Yao et al.

(10) Patent No.: US 10,662,755 B2
(45) Date of Patent: May 26, 2020

(54) SENSORS IN EARTH-BORING TOOLS, RELATED SYSTEMS, AND RELATED METHODS

(71) Applicants: Baker Hughes Oilfield Operations LLC, Houston, TX (US); Baker Hughes, a GE company, LLC, Houston, TX (US)

(72) Inventors: Richard Yao, The Woodlands, TX (US); Kenneth R. Evans, Spring, TX (US); Chaitanya K. Vempati, Conroe, TX (US); R. Keith Glasgow, Jr., Willis, TX (US); Navish Makkar, Celle (DE); Priscila Farias Ronqui, Orlando, FL (US); Eric C. Sullivan, Houston, TX (US)

(73) Assignees: Baker Hughes Oilfield Operations LLC, Houston, TX (US); Baker Hughes, a GE company, LLC, Houston, TX (US)

( * ) Notice: Subject to any disclaimer, the term of this patent is extended or adjusted under 35 U.S.C. 154(b) by 124 days.

(21) Appl. No.: 15/888,904

(22) Filed: Feb. 5, 2018

(65) Prior Publication Data
US 2019/0242237 A1    Aug. 8, 2019

(51) Int. Cl.
*E21B 47/00* (2012.01)
*G01L 1/16* (2006.01)
(Continued)

(52) U.S. Cl.
CPC .............. *E21B 47/00* (2013.01); *E21B 10/42* (2013.01); *E21B 47/011* (2013.01); *E21B 47/06* (2013.01);
(Continued)

(58) Field of Classification Search
CPC ........ E21B 47/00; E21B 47/06; E21B 47/011; E21B 47/024; E21B 47/065; E21B 10/42; E21B 10/62
See application file for complete search history.

(56) References Cited

U.S. PATENT DOCUMENTS

| | | | | |
|---|---|---|---|---|
| 5,931,000 A | * | 8/1999 | Turner | .................. E21B 36/003 166/66 |
| 6,135,218 A | * | 10/2000 | Deane | ..................... E21B 10/55 175/340 |

(Continued)

OTHER PUBLICATIONS

International Written Opinion for International Application No. PCT/US2019/016605 dated May 21, 2019, 5 pages.
(Continued)

*Primary Examiner* — David Carroll
(74) *Attorney, Agent, or Firm* — TraskBritt

(57) ABSTRACT

An earth-boring tool includes a shank. The shank may include a central bore extending partially through the shank. An end-cap may be disposed within the central bore, and the end-cap may include a first flange, a second flange, and a body portion extending between the first flange and the second flange. An annular chamber may be defined between the body portion of the end-cap and an interior wall of the central bore of the shank. At least one strain gauge may be secured to an outer surface of the body portion of the end-cap. At least one stain gauge may be secured to a cap portion welded over a recess formed in the earth-boring tool.

18 Claims, 10 Drawing Sheets

(51) Int. Cl.
  *G01V 9/00* (2006.01)
  *E21B 47/06* (2012.01)
  *E21B 47/01* (2012.01)
  *E21B 10/42* (2006.01)
  *G01V 3/18* (2006.01)

(52) U.S. Cl.
  CPC .............. *E21B 47/065* (2013.01); *G01L 1/16* (2013.01); *G01V 3/18* (2013.01); *G01V 9/00* (2013.01)

(56) References Cited

U.S. PATENT DOCUMENTS

| | | | |
|---|---|---|---|
| 7,604,072 | B2 | 10/2009 | Pastusek et al. |
| 7,849,934 | B2 | 12/2010 | Pastusek et al. |
| 7,859,934 | B2 | 12/2010 | Taniguchi et al. |
| 7,987,925 | B2 | 8/2011 | Pastusek et al. |
| 8,100,196 | B2 | 1/2012 | Pastusek et al. |
| 8,236,074 | B1 * | 8/2012 | Bertagnolli ............... B22F 7/04 51/307 |
| 8,573,326 | B2 | 11/2013 | Trinh et al. |
| 9,057,247 | B2 | 6/2015 | Kumar et al. |
| 9,372,124 | B2 | 6/2016 | Schlosser |
| 9,663,996 | B2 | 5/2017 | Yao |
| 9,784,099 | B2 | 10/2017 | Kale et al. |
| 2006/0272859 | A1 * | 12/2006 | Pastusek ................. E21B 21/08 175/40 |
| 2007/0018848 | A1 * | 1/2007 | Bottos ....................... E21B 4/02 340/854.4 |
| 2011/0024192 | A1 * | 2/2011 | Pastusek ................. E21B 21/08 175/45 |
| 2013/0186195 | A1 * | 7/2013 | Schlosser ............ E21B 47/0006 73/152.59 |
| 2013/0213129 | A1 * | 8/2013 | Kumar .................. E21B 47/011 73/152.47 |
| 2014/0013837 | A1 | 1/2014 | Lee |
| 2016/0123135 | A1 * | 5/2016 | Leeflang ................. E21B 47/06 73/152.12 |
| 2016/0160572 | A1 | 6/2016 | Yao |
| 2016/0194951 | A1 | 7/2016 | Hay |
| 2019/0186256 | A1 * | 6/2019 | Palmer .................... E21B 47/06 |

OTHER PUBLICATIONS

International Search Report for International Application No. PCT/US2019/016605 dated May 21, 2019, 4 pages.

* cited by examiner

US 10,662,755 B2

SENSORS IN EARTH-BORING TOOLS, RELATED SYSTEMS, AND RELATED METHODS

TECHNICAL FIELD

This disclosure relates generally to sensors carried by earth-boring tools for use in drilling wellbores. The disclosure further relates to methods of using sensors downhole.

BACKGROUND

Oil wells (wellbores) are usually drilled with a drill string. The drill string includes a tubular member having a drilling assembly that includes a drill bit at its bottom end. The drilling assembly may also include devices and sensors that provide information relating to a variety of parameters relating to the drilling operations ("drilling parameters"), behavior of the drilling assembly ("drilling assembly parameters") and parameters relating to the formations penetrated by the wellbore ("formation parameters"). A drill bit and/or reamer attached to the bottom end of the drilling assembly is rotated by rotating the drill string from the drilling rig and/or by a drilling motor (also referred to as a "mud motor") in the bottom hole assembly ("BHA") to remove formation material to drill the wellbore.

BRIEF SUMMARY

One or more embodiments of the present disclosure include an earth-boring tool. The earth-boring tool may include a body having a shank secured thereto, an end-cap, and at least one strain gauge. The shank may have a central bore extending through the shank. The end-cap may be at least partially disposed within the central bore of the shank, and the end-cap may include a first flange, a second flange, and a body portion extending between the first flange and the second flange. Furthermore, an annular chamber may be defined between the body portion of the end-cap and an interior wall of the central bore of the shank. The at least one strain gauge may be secured to an outer surface of the body portion of the end-cap, and a longitudinal length of the at least one strain gauge may be parallel to a longitudinal length of the body portion of the end-cap.

Some embodiments of the present disclosure may include an earth-boring tool. The earth-boring tool may include a body, a recess formed in a wall of the body, a sensor-securing system disposed in the recess, and a sensor disposed within the recess. The sensor-securing system may include a first wedge member disposed within the recess, a second wedge member disposed within the recess and adjacent to the first wedge member, wherein the first wedge member and the second wedge member define a first tapered aperture and a second tapered aperture, a first tapered fastener disposed within the first tapered aperture, and a second tapered fastener disposed within the second tapered aperture, wherein the first and second wedge members are configured to separate when the first and second tapered fasteners are tightened. The sensor may be disposed between the first wedge member and a sidewall of the recess.

Further embodiments of the present disclosure include an earth-boring tool. The earth-boring tool may include a body, a recess formed in wall of the body, and a cap portion disposed within the recess. The cap portion may include at least one sputtered strain gauge formed on an inner surface of the cap portion, and a sensor may be disposed within the recess between a base of the recess and the inner surface of the cap portion.

BRIEF DESCRIPTION OF THE DRAWINGS

For a detailed understanding of the present disclosure, reference should be made to the following detailed description, taken in conjunction with the accompanying drawings, in which like elements have generally been designated with like numerals, and wherein.

DETAILED DESCRIPTION

The illustrations presented herein are not actual views of any particular drilling system, drilling tool assembly, or component of such an assembly, but are merely idealized representations, which are employed to describe the present invention.

As used herein, the terms "bit" and "earth-boring tool" each mean and include earth boring tools for forming, enlarging, or forming and enlarging a wellbore. Non-limiting examples of bits include fixed-cutter ("drag") bits, fixed-cutter coring bits, fixed-cutter eccentric bits, fixed-cutter bicenter bits, fixed-cutter reamers, expandable reamers with blades bearing fixed cutters, and hybrid bits including both fixed cutters and movable cutting structures (roller cones).

As used herein, any relational term, such as "first," "second," "front," "back," "lower," "upper," "outer," "inner," etc., is used for clarity and convenience in understanding the disclosure and accompanying drawings, and does not connote or depend on any specific preference or order, except where the context clearly indicates otherwise.

As used herein, the term "substantially" in reference to a given parameter, property, or condition means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

Figure 1:
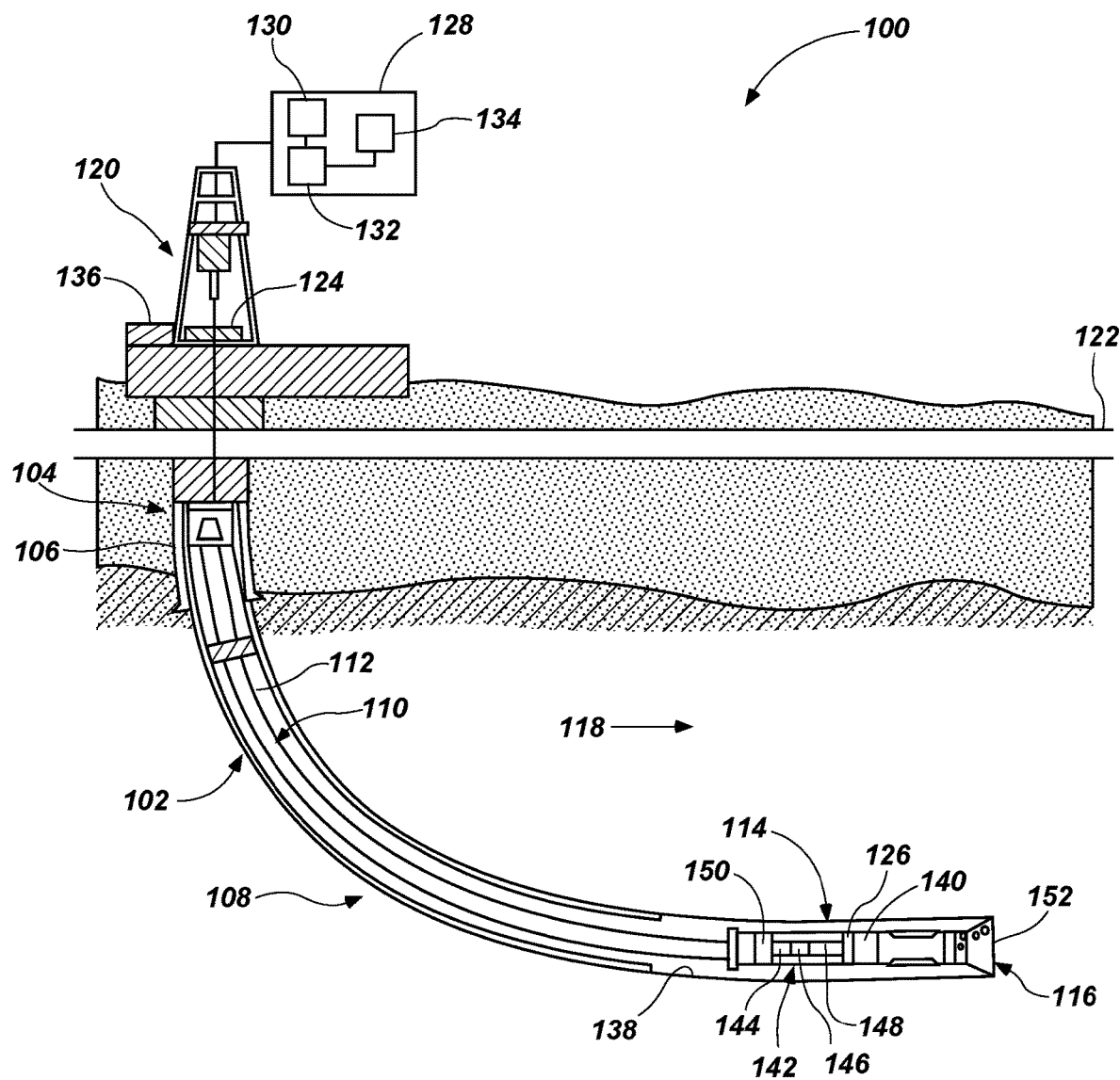
FIG. 1 is a schematic diagram of a wellbore system comprising a drill string that includes one or more sensors according to an embodiment of the present disclosure.

FIG. 1 is a schematic diagram of an example of a drilling system 100 that may utilize the apparatuses and methods disclosed herein for drilling wellbores. FIG. 1 shows a wellbore 102 that includes an upper section 104 with a casing 106 installed therein and a lower section 108 that is being drilled with a drill string 110. The drill string 110 may include a tubular member 112 that carries a drilling assembly 114 at its bottom end. The tubular member 112 may be made up by joining drill pipe sections or it may be a string of coiled tubing. A drill bit 116 may be attached to the bottom end of the drilling assembly 114 for drilling the wellbore 102 of a selected diameter in a formation 118.

The drill string 110 may extend to a rig 120 at the surface 122. The rig 120 shown is a land rig 120 for ease of explanation. However, the apparatuses and methods disclosed equally apply when an offshore rig 120 is used for drilling wellbores under water. A rotary table 124 or a top drive may be coupled to the drill string 110 and may be utilized to rotate the drill string 110 and to rotate the drilling assembly 114, and thus the drill bit 116 to drill the wellbore 102. A drilling motor 126 (also referred to as "mud motor") may be provided in the drilling assembly 114 to rotate the drill bit 116. The drilling motor 126 may be used alone to rotate the drill bit 116 or to superimpose the rotation of the drill bit 116 by the drill string 110. The rig 120 may also include conventional equipment, such as a mechanism to add additional sections to the tubular member 112 as the wellbore 102 is drilled. A surface control unit 128, which may be a computer-based unit, may be placed at the surface 122 for receiving and processing downhole data transmitted by sensors 140 in the drill bit 116 and sensors 140 in the drilling assembly 114, and for controlling selected operations of the various devices and sensors 140 in the drilling assembly 114. The sensors 140 may include one or more of sensors 140 that determine acceleration, weight on bit, torque, pressure, cutting element positions, rate of penetration, inclination, azimuth formation/lithology, etc. In some embodiments, the surface control unit 128 may include a processor 130 and a data storage device 132 (or a computer-readable medium) for storing data, algorithms, and computer programs 134. The data storage device 132 may be any suitable device, including, but not limited to, a read-only memory (ROM), a random-access memory (RAM), a Flash memory, a magnetic tape, a hard disk, and an optical disc. During drilling, a drilling fluid from a source 136 thereof may be pumped under pressure through the tubular member 112, which discharges at the bottom of the drill bit 116 and returns to the surface 122 via an annular space (also referred as the "annulus") between the drill string 110 and an inside wall 138 of the wellbore 102.

The drilling assembly 114 may further include one or more downhole sensors 140 (collectively designated by numeral 140). The sensors 140 may include any number and type of sensors 140, including, but not limited to, sensors 140 generally known as the measurement-while-drilling (MWD) sensors 140 or the logging-while-drilling (LWD) sensors 140, and sensors 140 that provide information relating to the behavior of the drilling assembly 114, such as drill bit rotation (revolutions per minute or "RPM"), tool face, pressure, vibration, whirl, bending, and stick-slip. The drilling assembly 114 may further include a controller unit 142 that controls the operation of one or more devices and sensors 140 in the drilling assembly 114. For example, the controller unit 142 may be disposed within the drill bit 116 (e.g., within a shank and/or crown of a bit body of the drill bit 116). The controller unit 142 may include, among other things, circuits to process the signals from sensor 140, a processor 144 (such as a microprocessor) to process the digitized signals, a data storage device 146 (such as a solid-state-memory), and a computer program 148. The processor 144 may process the digitized signals, and control downhole devices and sensors 140, and communicate data information with the surface control unit 128 via a two-way telemetry unit 150.

The drill bit 116 may include a face section 152 (or bottom section). The face section 152 or a portion thereof may face the undrilled formation 118 in front of the drill bit 116 at the wellbore 102 bottom during drilling. In some embodiments, the drill bit 116 may include one or more cutting elements and, more specifically, a blade projecting from the face section 152.

Figure 2:
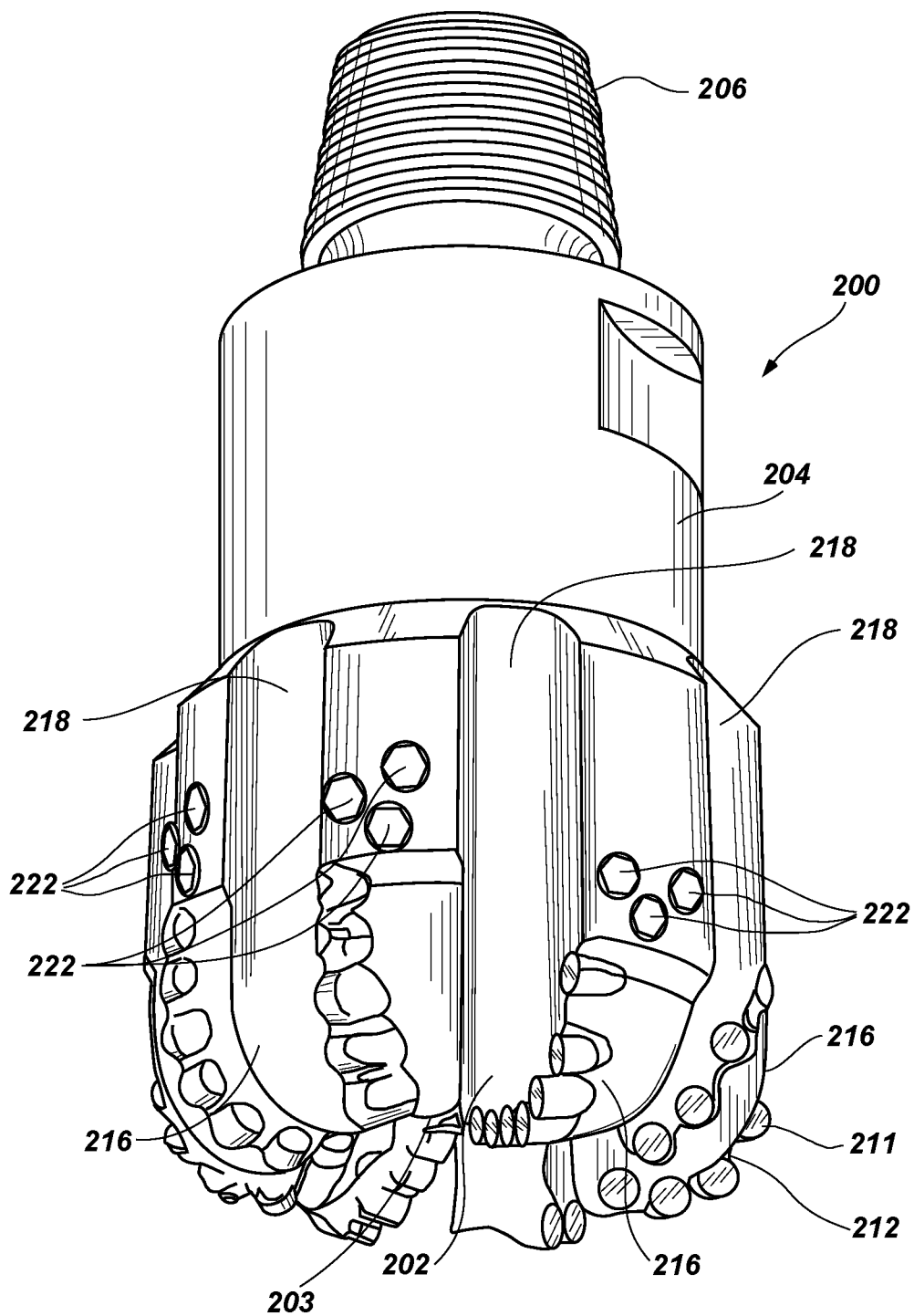
FIG. 2 is a perspective view of a drill bit according to an embodiment of the present disclosure.

FIG. 2 is a perspective view of a fixed-cutter earth-boring rotary drill bit 200 that may be used in conjunction with the drilling system 100 of FIG. 1. The drill bit 200 includes a bit body 202 that may be secured to a shank 204 having a threaded connection portion 206 (e.g., an American Petroleum Institute (API) threaded connection portion) for attaching the drill bit 200 to a drill string (e.g., drill string 110, shown in FIG. 1). In some embodiments, the bit body 202 may be secured to the shank 204 using an extension. In other embodiments, the bit body 202 may be secured directly to the shank 204.

The bit body 202 may include internal fluid passageways that extend between the face 203 of the bit body 202 and a longitudinal bore, extending through the shank 204, the extension, and partially through the bit body 202. Nozzle inserts also may be provided at the face 203 of the bit body 202 within the internal fluid passageways. The bit body 202 may further include a plurality of blades 216 that are separated by junk slots 218. In some embodiments, the bit body 202 may include gauge wear plugs 222 and wear knots. A plurality of cutting element assemblies 211 may be mounted on the face 203 of the bit body 202 in cutting element pockets 212 that are located along each of the blades 216. The cutting element assemblies 211 may include PDC cutting elements, or may include other cutting elements.

Figure 3A:
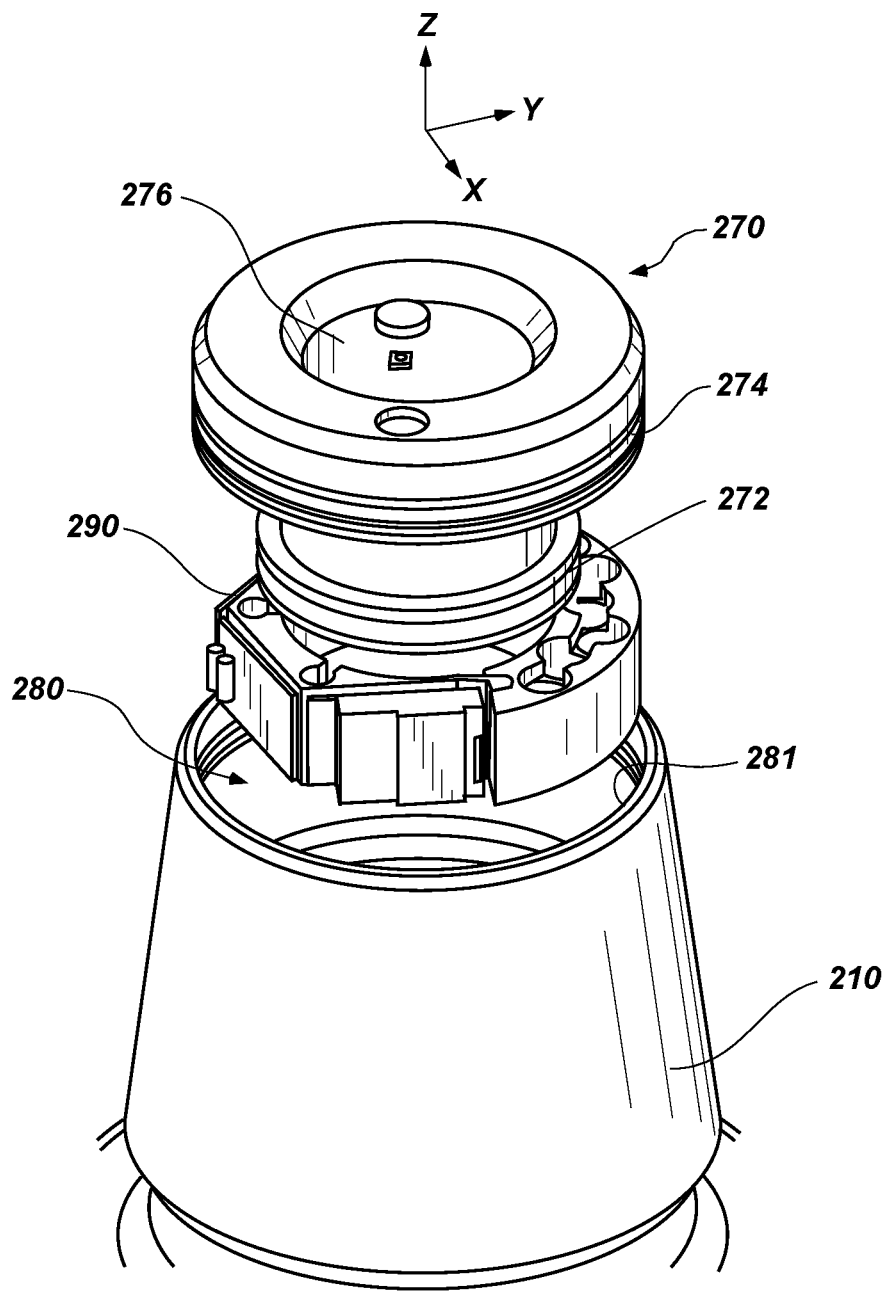
FIG. 3A is a perspective view of a shank of a drill bit having an end-cap disposed at least partially therein according to an embodiment of the present disclosure.
Figure 3B:
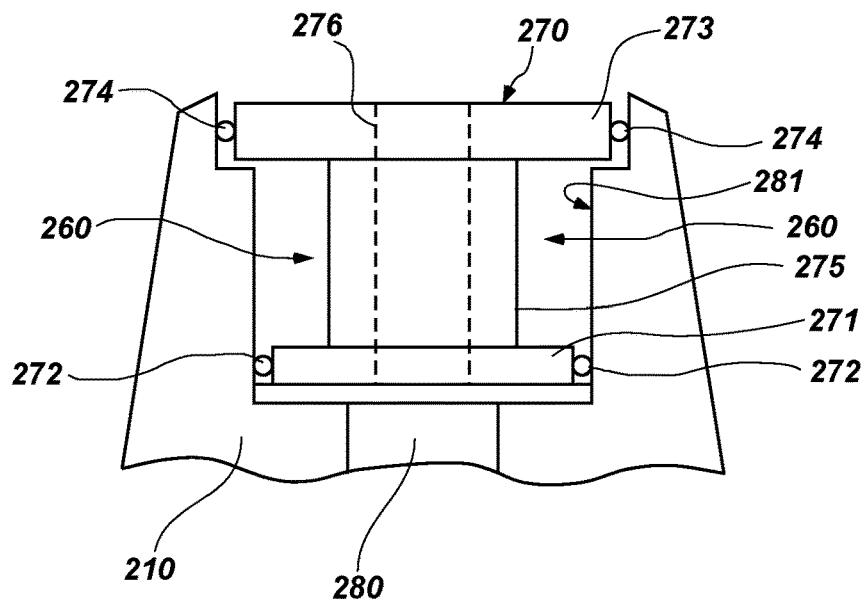
FIG. 3B is a cross-sectional view of a shank and an end-cap according to another embodiment of the present disclosure.

FIG. 3A is a perspective view of a shank 210 secured to a drill bit 200 (FIG. 2), an end-cap 270 received within the shank 210, and an electronics module 290. FIG. 3B is a side cross-sectional view of the end-cap 270 at least partially disposed within the shank 210. Referring to FIGS. 3A and 3B together, the shank 210 may include a central bore 280 formed along a center longitudinal axis of the shank 210. As is discussed in greater detail below, the central bore 280 may be sized and shaped to receive at least a portion of the end-cap 270.

The end-cap 270 may include a first flange 271 at a first longitudinal end (e.g., a lower end) of the end-cap 270, a second flange 273 at a second opposite longitudinal end (e.g., an upper end) of the end-cap 270, and a body portion 275 extending between the first flange 271 and the second flange 273. The first flange 271 may include a first sealing ring 272, and the second flange 273 may include a second sealing ring 274. In some embodiments, the end-cap 270 may further include a cap bore 276 extending longitudinally (i.e., along a center longitudinal axis) therethrough. As a result, drilling mud may flow through the end-cap 270, through the central bore 280 of the shank 210 to the other side of the shank 210, and then into the body 202 of drill bit 200. Accordingly, the cap bore 276 may be subjected to conditions (e.g., high temperatures and pressures) experienced downhole.

In one or more embodiments, when the end-cap 270 is at least partially disposed within the central bore 280, an interior wall 281 of the central bore 280 and the end-cap 270 may define an at least substantially annular chamber 260. Furthermore, the annular chamber 260 may have a sufficient width to receive (e.g., have disposed therein) the electronics module 290. Furthermore, the central bore 280 may have a sufficiently small diameter as to not detrimentally affect the structural integrity of the shank 210. As a result, the electronics module 290 may be disposed within the central bore 280 and about the end-cap 270.

The first and second flanges 271, 273 may be sized and shaped to form fluid tight seals with an interior wall 281 of the central bore 280 of the shank 210. In some instances, the first sealing ring 272 and the second sealing ring 274 may form a protective, fluid-tight seal between the end-cap 270 and the interior wall 281 of the central bore 280 to protect the electronics module 290 from adverse environmental conditions (e.g., high pressures). The protective seal formed by the first sealing ring 272 and the second sealing ring 274 may also be configured to maintain the annular chamber 260 at approximately atmospheric pressure.

In one or more embodiments, the first sealing ring 272 and the second sealing ring 274 are formed of material suitable for a high-pressure, high-temperature environment, such as, for example, a Hydrogenated Nitrile Butadiene Rubber (HNBR) O-ring in combination with a PEEK back-up ring. In addition, the end-cap 270 may be secured to the shank 210 with a number of connection mechanisms such as, for example, a secure press-fit using sealing rings 272 and 274, a threaded connection, an epoxy connection, a shape-memory retainer, a welded connection, and/or a brazed connection. It will be recognized by those of ordinary skill in the art that the end-cap 270 may be held in place relatively firmly by a relatively simple connection mechanism due to differential pressure and downward mud flow during drilling operations.

The electronics module 290 may include a flex-circuit board. The flex-circuit board may include a high-strength reinforced backbone (not shown) to provide acceptable transmissibility of acceleration effects to sensors such as accelerometers. In addition, other areas of the flex-circuit board bearing non-sensor electronic components may be attached to the end-cap 270 in a manner suitable for at least partially attenuating the acceleration effects experienced by the drill bit 200 during drilling operations using a material such as a visco-elastic adhesive. In view of the foregoing, the drill bit 200 (FIG. 2) may include any of the shanks and electronics modules described in, for example, U.S. Pat. No. 8,100,196, to Pastusek et al., filed Feb. 6, 2009, issued Jun. 24, 2012, U.S. Pat. No. 7,849,934, to Pastusek et al., filed Feb. 16, 2007, and U.S. Pat. No. 7,604,072, to Pastusek et al., filed Jun. 7, 2005, issued Oct. 20, 2009, the disclosures of which are incorporated in their entireties by this reference herein.

The electronics module 290 may be utilized to perform a variety of functions. In some embodiments, the electronics module 290 may include a data analysis module, which may sample data in different sampling modes, sample data at different sampling frequencies, and analyze data. Furthermore, in one or more embodiments, the electronics module 290 may include a power supply, a processor, a memory, and at least one sensor for measuring a plurality of physical parameters related to a drilling state, which may include drill bit conditions, drilling operation conditions, and environmental conditions proximate the drill bit 200 (FIG. 2). For example, the sensor may include one or more accelerometers, one or more magnetometers, and at least one temperature sensor.

Figure 4A:
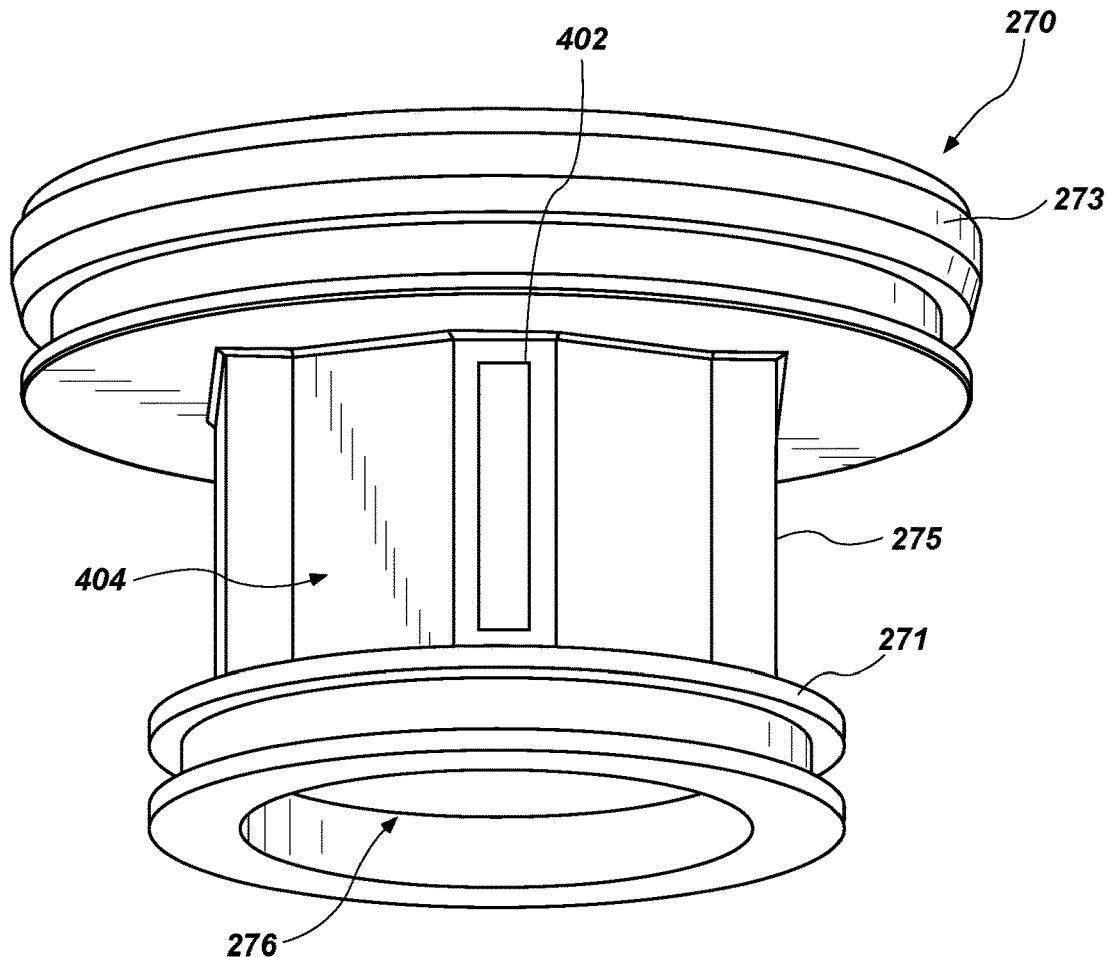
FIG. 4A is a perspective view of an end-cap according to one or more embodiments of the present disclosure.
Figure 4B:
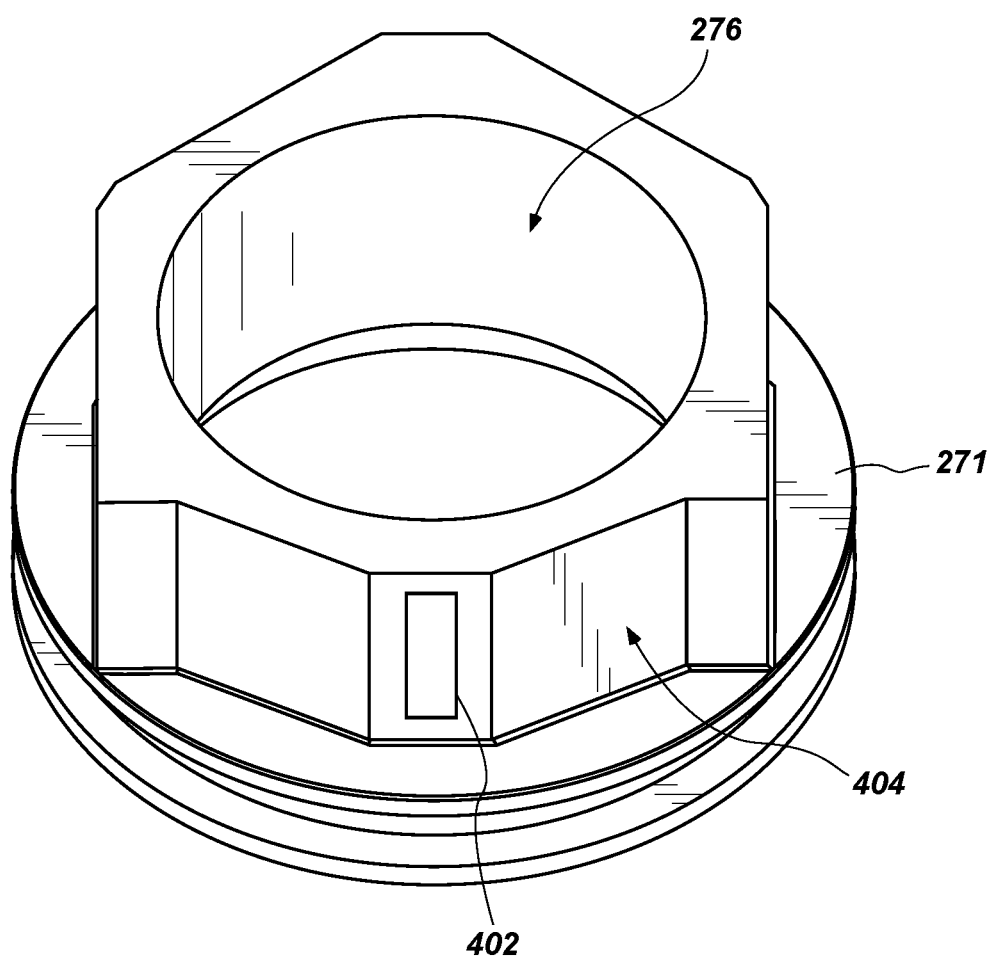
FIG. 4B is another perspective view of an end-cap according to one or more embodiments of the present disclosure.

FIG. 4A is a perspective view of an end-cap 270 according to one or more embodiments of the present disclosure. FIG. 4B is a top perspective view of the end-cap 270 of FIG. 4A without the second flange 273 in order better show other elements of the end-cap 270. Referring to FIGS. 4A and 4B together, as described above, the end-cap 270 may include a first flange 271, a second flange 273, and a body portion 275 extending between the first flange 271 and the second flange 273. However, in some embodiments, the end-cap 270 may further include at least one sensor 402 attached an outer wall 404 of the body portion 275 of the end-cap 270. As a result, the at least one sensor 402 may be disposed within the annular chamber 260 (FIG. 3B) and may be afforded the protections described above in regard to the annular chamber 260 (FIG. 3B).

In one or more embodiments, the at least one sensor 402 may include a strain gauge. For example, the at least one sensor 402 may include a piezoelectric gauge. For instance, the at least one sensor 402 may include a sensor that utilizes a piezoelectric effect (as is known in the art) to measure changes in pressure, acceleration, temperature, strain, and/or force by converting them into an electric charge.

In some embodiments, a longitudinal length of the at least one sensor 402 may be parallel to the longitudinal length of the end-cap 270. In other words, the at least one sensor 402 may extend along a longitudinal length of the end-cap 270. Furthermore, in some embodiments, the at least one sensor 402 may be secured to the outer wall 404 of the body portion 275 via one or more of adhesives, welds, cements, etc. For instance, in some embodiments, the at least one sensor 402 may be secured to the outer wall 404 of the body portion 275 via an epoxy. In other embodiments, the at least one sensor 402 may be secured to the outer wall 404 of the body portion 275 via one or more tack welds or ceramic cements.

Referring to FIGS. 3A-4B together, as noted above, the annular chamber 260, in which the at least one sensor 402 is disposed, may not be subject to the high pressures and/or other environmental conditions experienced downhole. However, as discussed above, the cap bore 276 extending through the end-cap 270 may be subjected to the high pressures, temperatures and other environmental conditions experienced downhole during a drilling operation. Furthermore, the body portion 275 may have a relatively thin outer wall 404. For instance, the outer wall 404 of the body portion 275 may have a thickness within a range of about 0.125 inch and about 0.50 inch. As a result, the body portion 275 may flex (e.g., bow outward, bulge, etc.) due to the disparity between the high pressure within the cap bore 276 of the end-cap 270 and the atmospheric pressure within the annular chamber 260 of the end-cap 270. Moreover, due to the flexing of the body portion 275 of the end-cap 270, the at least one sensor 402 may be used to measure a strain exhibited by the body portion 275, and based on the measured strain and a known thickness of the outer wall 404 of the body portion 275 of the end-cap 270, the surface control unit 128 (FIG. 1), an external controller, and/or an operator can determine one or more of a borehole pressure, an annulus pressure, a pressure drop across the drill bit 200 (FIG. 2) (e.g., a drill bit 200 including multiple sensors at different locations), etc. Furthermore, determining one or more of the borehole pressure and the annulus pressure enables the surface control unit 128 (FIG. 1) to measure torque on bit ("TOB") and weight on bit ("WOB").

In some embodiments, the at least one sensor 402 may include a plurality of sensors 402. Furthermore, in some instances, the plurality of sensors 402 may be disposed at different locations on the body portion 275 of the end-cap 270. In further embodiments, the plurality of sensors 402 may be disposed at different locations across the drill bit 200 (FIG. 2) and/or drill string 110, as is discussed in regard to FIGS. 5A-8B. For instance, the plurality of sensors 402 may be secured to a hatch cover or any other relatively thin portion of the drill bit 200 (FIG. 2). Additionally, the plurality of sensors 402 can be secured in any of the manners described above.

Referring still to FIGS. 4A and 4B, utilizing a piezoelectric strain gauge in comparison to conventional strain gauges may enable the at least one sensor 402 to more accurately measure downhole conditions (e.g., downhole pressure). For instance, piezoelectric gauges are typically between about ten and about one hundred times more sensitive to an applied stress than conventional strain gauges. As a result, the at least one sensor 402 may be able to measure flexing within the outer wall 404 of the body portion 275 of the end-cap 270 not typically measureable by a conventional strain gauge.

In view of the foregoing, the at least one sensor 402 of the present disclosure and the placement of the at least one sensor 402 of the present disclosure may be advantageous over conventional sensors and placements. For instance, because the at least one sensor 402 is disposed within the annular chamber 260 (i.e., protected from downhole conditions) but is secured to a wall (i.e., the outer wall 404 of the body portion 275 of the end-cap 270) subjected to downhole conditions, the at least one sensor 402 can acquire data (via measuring strains within the wall) regarding the downhole conditions without being subjected to the downhole conditions. As a result, the at least one sensor 402 may provide more reliable data, may have an increased lifetime, and may result in costs savings relative to conventional sensors.

Figure 5A:
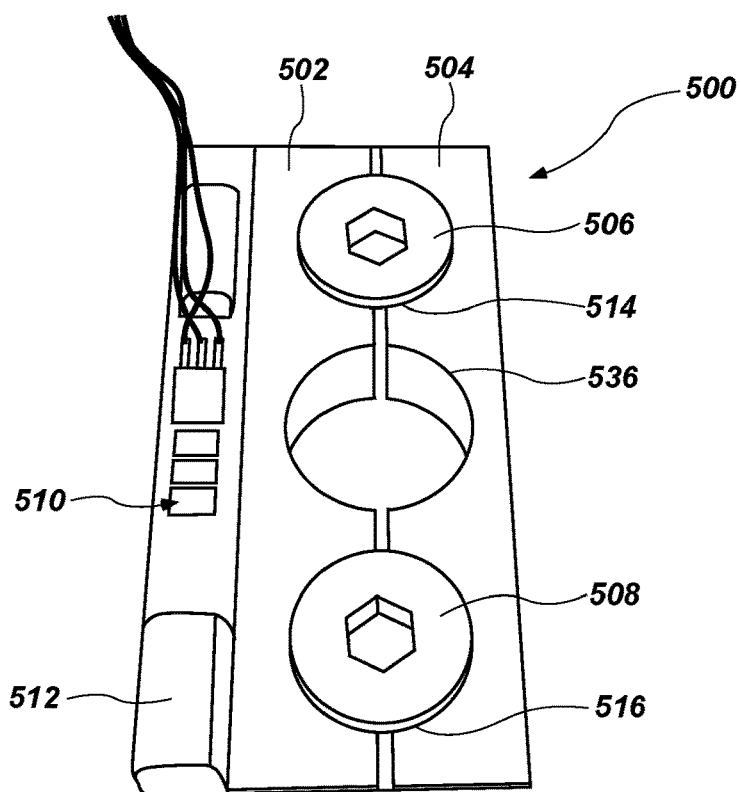
FIG. 5A is a schematic top view of a sensor-securing system according to one or more embodiments of the present disclosure.
Figure 5B:
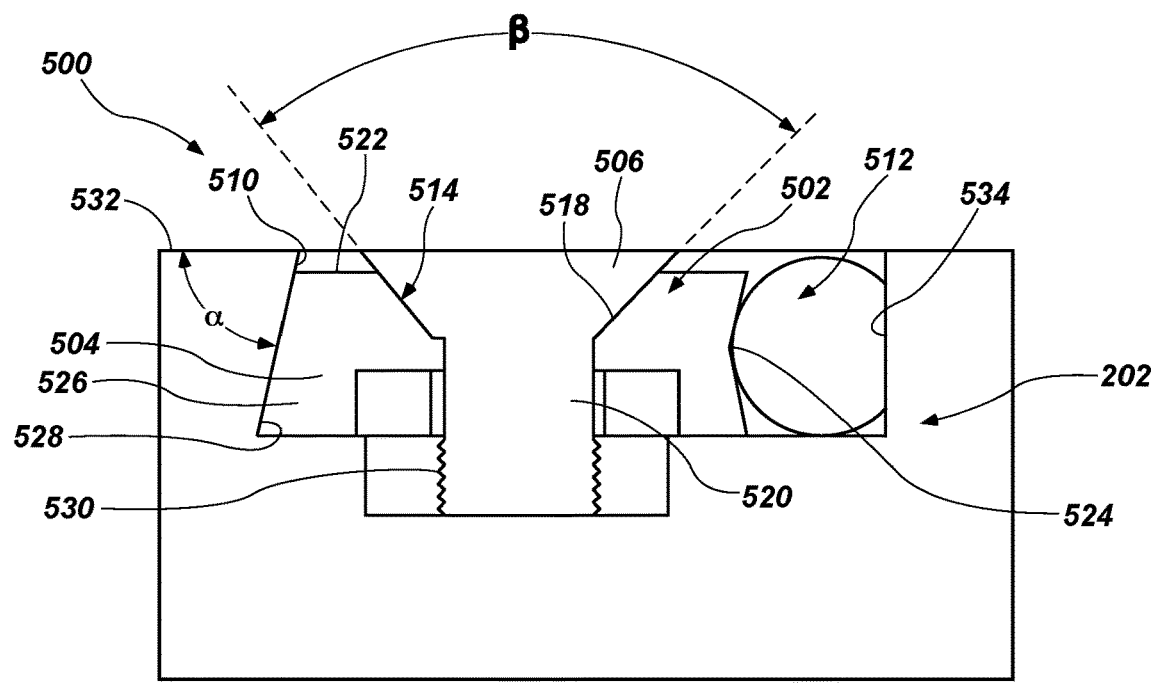
FIG. 5B is a schematic side view of the sensor-securing system of FIG. 5A.

FIG. 5A is a top view of a sensor-securing system 500 according to one or more embodiments of the present disclosure. FIG. 5B is a side cross-sectional view of the sensor-securing system 500 of FIG. 5A. Referring to FIGS. 5A and 5B together, the sensor-securing system 500 may include a first wedge member 502, a second wedge member 504, a first tapered fastener 506, and a second tapered fastener 508. As is described in greater detail below, the sensor-securing system 500 may be utilized to secure one or more sensors to a wall of a drill bit 200 (FIG. 2). For instance, when in use, the sensor-securing system 500 may be disposed within a recess 510 formed within a wall of a portion (e.g., a bit body 202) of a drill bit 200 (FIG. 2). In order to facilitate a clear explanation of the sensor-securing system 500 and the components thereof, the sensor-securing system 500 is described herein as being disposed within a recess 510 within a bit body 202 of a drill bit 200 (FIG. 2). However, the sensor-securing system 500 is not so limited, and one of ordinary skill in the art will readily recognize that the sensor-securing system 500 may be disposed within a recess 510 formed on any component of a drill string 110 (e.g., shanks, blades, subs, pipes, or any other component) (FIG. 1).

In some embodiments, the recess 510 may be at least generally rectangular in shape. In other embodiments, the recess 510 may have any other shape (e.g., circular, triangular, etc.). Furthermore, a sensor 512 (to be secured within the recess 510) may be disposed within the recess 510 and along a lateral side of (i.e., adjacent to) the sensor-securing system 500 within the recess 510. As is discussed in greater detail below, the sensor-securing system 500 may be utilized to press the sensor 512 up against a wall of the recess 510, thus, securing the sensor 512 within the recess 510 via mechanical interference between the sensor-securing system 500 and sidewalls of the recess 510. In some embodiments, the sensor 512 may include one or more of a pressure sensor, a temperature sensor, a torque sensor, an accelerometer, a strain gauge (e.g., any of the strain gauges described above), or a vibration sensor.

The first and second wedge members 502, 504 may be disposed alongside each other along longitudinal lengths of the first and second wedge members 502, 504. When aligned next to each other, the first and second wedge members 502, 504 may define a first tapered aperture 514. Furthermore, a first lateral half of the first tapered aperture 514 may be defined by the first wedge member 502, and a second correlating lateral half of the first tapered aperture 514 may be defined by the second wedge member 504 such that, when the first and second wedge members 502, 504 are aligned up next to each other, the first tapered aperture 514 is defined by the correlating lateral halves. Likewise, when aligned next to each other, the first and second wedge members 502, 504 may define a second tapered aperture 516. Furthermore, a first lateral half of the second tapered aperture 516 may be defined by the first wedge member 502, and a second correlating lateral half of the second tapered aperture 516 may be defined by the second wedge member 504 such that, when the first and second wedge members 502, 504 are aligned up next to each other, the second tapered aperture 516 is defined by the correlating lateral halves. In some embodiments, the first and second tapered apertures 514, 516 may be formed proximate to opposing longitudinal ends of the first and second wedge members 502, 504.

Both of the first and second tapered apertures 514, 516 may include a tapered portion 518 and a straight portion 520. For instance, the first and second tapered apertures 514, 516 may include countersink holes. The tapered portion 518 may extend down through the first and second wedge members 502, 504 from a top surface 522 of the first and second wedge members 502, 504 (e.g., a surface aligned with an outer surface 532 of a wall of the bit body 202 within which the sensor-securing system 500 is disposed). In some embodiments, the tapered portion 518 may define an angle β between opposing surfaces of the tapered portion 518. In some embodiments, the angle β may between about 70° and about 120°. In some embodiments, the angle β may be selected to achieve a particular distance traveled by the first and second wedge members 502, 504. The straight portion 520 may extend from the tapered portion 518 and may extend through a remaining thickness of the first and second wedge members 502, 504 to a base of the recess 510.

In some embodiments, the first wedge member 502 may include a shallow V-shaped valley 524 (or conic valley) formed in a lateral side of the first wedge member 502 intended to press up against the sensor 512. For example, the first wedge member 502 may include a shallow V-shaped valley 524 formed in lateral side of the wedge member opposite a lateral side of the first wedge member 502 forming lateral halves of the first and second tapered apertures 514, 516. In one or more embodiments, the shallow V-shaped valley 524 may extend into the first wedge member 502 in a direction perpendicular to a surface of the sidewall of the recess 510 facing the lateral side of the first wedge member 502. As a result, when in use, the sensor 512 may be at least partially pressed into the shallow V-shaped valley 524. The shallow V-shaped valley 524, in comparison to a planar surface, may more firmly secure the sensor 512 within a space between the lateral side of the first wedge member 502 and a sidewall of the recess 510 via mechanical interference. In other embodiments, the first wedge member 502 may include a curved or rectangular valley for firmly securing the sensor 512 within the space between the lateral side of the first wedge member 502 and the sidewall of the recess 510 via mechanical interference.

Additionally, the second wedge member 504 may include a slanted (i.e., negatively raked) lateral side 526 opposite a lateral side of the second wedge member 504 forming the lateral halves of the first and second tapered apertures 514, 516. Furthermore, a sidewall of the recess 510 facing the slanted lateral side 526 of the second wedge member 504 may include slanted sidewall 528 correlating to the slanted lateral side 526 of the second wedge member 504. In other words, the slanted sidewall 528 of the recess 510 may be sized and shaped to abut up against (e.g., fit) the slanted lateral side 526 of the second wedge member 504. As is discussed in greater detail, the slanted lateral side 526 of the second wedge member 504 and the correlating slanted sidewall 528 of the recess 510 make assist in securing the first and second wedge members 502, 504 within the recess 510. In other embodiments, the recess 510 may not include slanted sidewalls.

Referring still to FIGS. 5A and 5B together, in some embodiments, the sensor-securing system 500 may include a first threaded hole 530 and a second threaded hole with each of the first threaded hole 530 and the second threaded hole corresponding to a respective aperture of the first and second tapered apertures 514, 516 and extending into the wall of the bit body 202 from a base of the recess 510. The first and second threaded holes 530 may be sized and shaped to receive respective threaded longitudinal ends of the first and second tapered fasteners 506, 508. Each of the first and second tapered fasteners 506, 508 may include a countersink screw or bolt. Furthermore, the size and shape of each of the first and second tapered fasteners 506, 508 may correlate to the size and shape of the first and second tapered apertures 514, 516, respectively.

In some embodiments, the recess 510 may have depth within a range of about 0.10 inch and about 0.50 inch. Furthermore, the recess 510 may have a width within a range of about 0.75 inch and about 2.0 inches. Moreover, the recess 510 may have a length within a range of about 1.5 inches and about 5.0 inches. As discussed above, the recess 510 includes a slanted lateral sidewall 528. In some embodiments, a surface of the slanted sidewall 528 may define an angle $\alpha$ with an outer surface 532 of the bit body 202 in which the recess 510 is formed. In some embodiments, the angle $\alpha$ may be within a range of about 75° to about 89°. Additionally, the recess 510 includes a non-slanted lateral sidewall 534 opposite the slanted lateral sidewall 528 (e.g., a sidewall into which the sensor 512 is pressed). For instance, a surface of the non-slanted lateral sidewall 534 may be substantially perpendicular to the outer surface 532 of the bit body 202 in which the recess 510 is formed.

In one or more embodiments, when the first and second wedge members 502, 504 are aligned next to each other, the first and second wedge members 502, 504 may further define a central aperture 536 extending through the first and second wedge members 502, 504. Furthermore, a first lateral half of the central aperture 536 may be defined by the first wedge member 502, and a second correlating lateral half of the central aperture 536 may be defined by the second wedge member 504 such that, when the first and second wedge members 502, 504 are aligned up next to each other, the central aperture 536 is defined by the correlating lateral halves. The central aperture 536 may provide access for a conduit and/or wires to the sensor and may reduce an overall weight of the first and second wedge members 502, 504.

In operation, the first and second wedge members 502, 504 may be disposed within the recess 510 while defining the first and second tapered apertures 514, 516. The first and second tapered fasteners 506, 508 may be disposed within the first and second tapered apertures 514, 516, respectively. Additionally, the sensor 512 may be disposed adjacent to the first and second wedge members 502, 504 on a lateral side of the first wedge member 502 and within the recess 510. The first and second tapered fasteners 506, 508 may then be tightened (i.e., rotated within the first and second threaded holes 530). By tightening the first and second tapered fasteners 506, 508, the first and second wedge members 502, 504 may slide along the tapered surfaces of the first and second tapered fasteners 506, 508. As a result, the first and second wedge members 502, 504 may separate from each other and/or may spread further apart from each other. Due to the first and second wedge members 502, 504 separating, the first wedge member 502 may be pressed against the sensor 512 and the second wedge member 504 may be pressed against the slanted sidewall 528 of the recess 510. Additionally, the sensor 512 may be pressed up against a sidewall (e.g., non-slanted sidewall 534) of the recess 510 opposite the slanted sidewall 528 and may be pressed into the shallow V-shaped valley 524 of the first wedge member 502, and the slanted lateral side 526 of the second wedge member 504 may be pressed up against the slanted sidewall 528 of the recess 510. As a result, the sensor 512 may be secured between the first wedge member 502 and the non-slanted sidewall 534 of the recess 510.

The sensor-securing system 500 may at least substantially evenly press the sensor 512 against the non-slanted sidewall 534 of the recess 510. As a result, the sensor-securing system 500 may provide an at least substantially even distribution of a load across the sensor 512. Accordingly, the sensor-securing system 500 may provide a more secure fitting for the sensor 512 in comparison to conventional manners of securing sensors to a portion of a drill bit. Additionally, the sensor-securing system 500 may exhibit little to no profile relative to the outer surface 532 of the bit body 202 of the drill bit 200 (FIG. 2). As a result, the sensor-securing system 500 may avoid catching on a formation and/or debris during a drilling operation. The foregoing may lead to longer lifespans and cost savings relative to conventional sensors securing methods.

Figure 6:
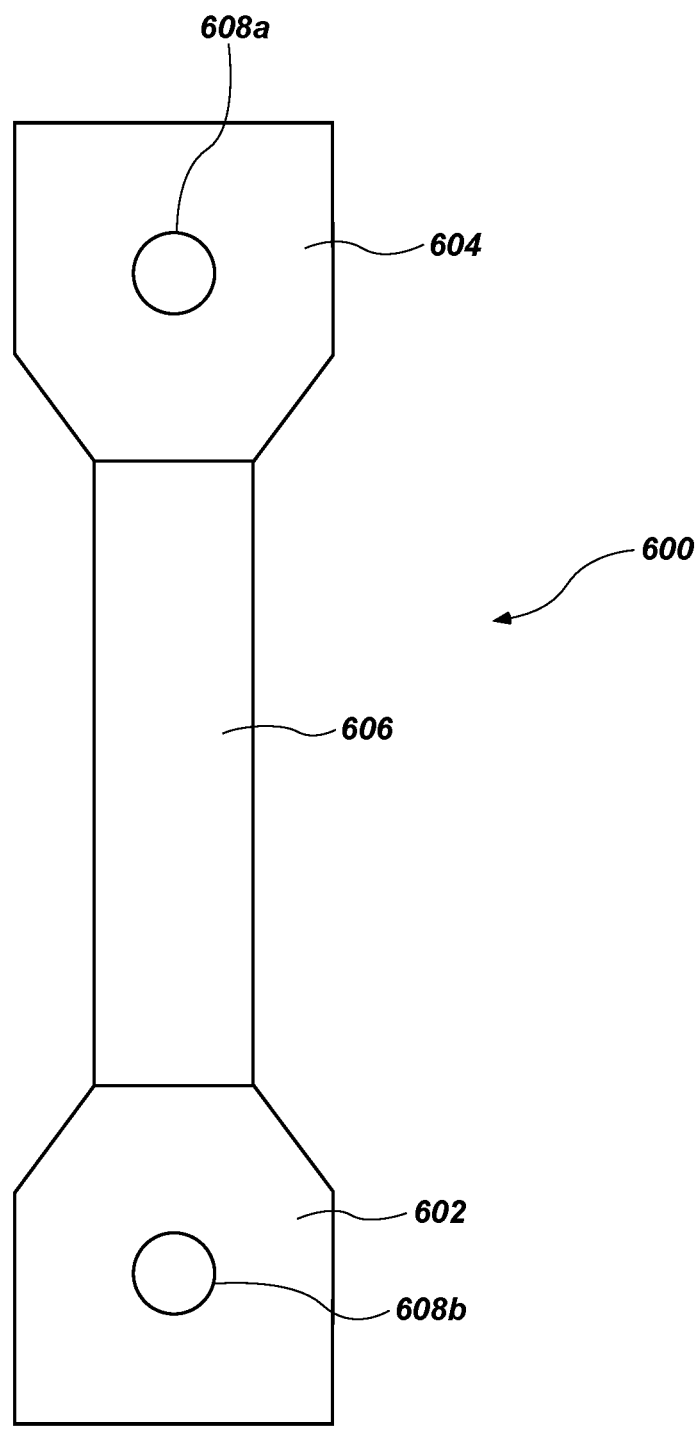
FIG. 6 is a schematic side view of a sensor-securing system according to another embodiment of the present disclosure.

FIG. 6 shows a schematic top view of a sensor-securing system 600 according to another embodiment of the present disclosure. In some embodiments, the sensor-securing system 600 may include a first tab 602 and a second tab 604 that can be tack welded to a bit body 202 of the drill bit 200. The first tab 602 may be secured to a first longitudinal end of a sensor 606 (e.g., a pressure sensor, a temperature sensor, a torque sensor, an accelerometer, a strain gauge, etc.), and the second tab 604 may be secured to a second longitudinal end of the sensor 606. In some embodiments, the first tab 602 and second tab 604 may form integral portions of the sensor 606. In other embodiments, the first tab 602 and second tab 604 may be secured to the longitudinal ends of the sensor 606 via one or more of an adhesive, weld, or fastener (e.g., screw or bolt).

In some embodiments, each of the first tab 602 and the second tab 604 may have an aperture 608a, 608b extending through the tab. As a result, the first tab 602 and the second tab 604 may be tack welded to the bit body 202 (FIG. 2) of the drill bit 200 (FIG. 2). In one or more embodiments, the sensor 606 and the first and second tabs 602, 604 may be disposed within a recess (e.g., any of the recesses described herein) in the bit body 202 (FIG. 2) of the drill bit 200 (FIG. 2). Attaching the sensor 606 to the bit body 202 (FIG. 2) via first and second tabs 602, 604 may enable sensors to be secured to two different discrete locations of the bit body 202 (FIG. 2) of the drill bit 200 (FIG. 2) in order to minimize distortion in measurements. Furthermore, attaching the sensor 606 to the bit body 202 (FIG. 2) via the first and second tabs 602, 604 may allow sensors to be easily removed and replaced if the sensor 606 is damaged during a drilling process. For instance, the sensor 606 may be removed by merely removing the tack welds.

Figure 7:
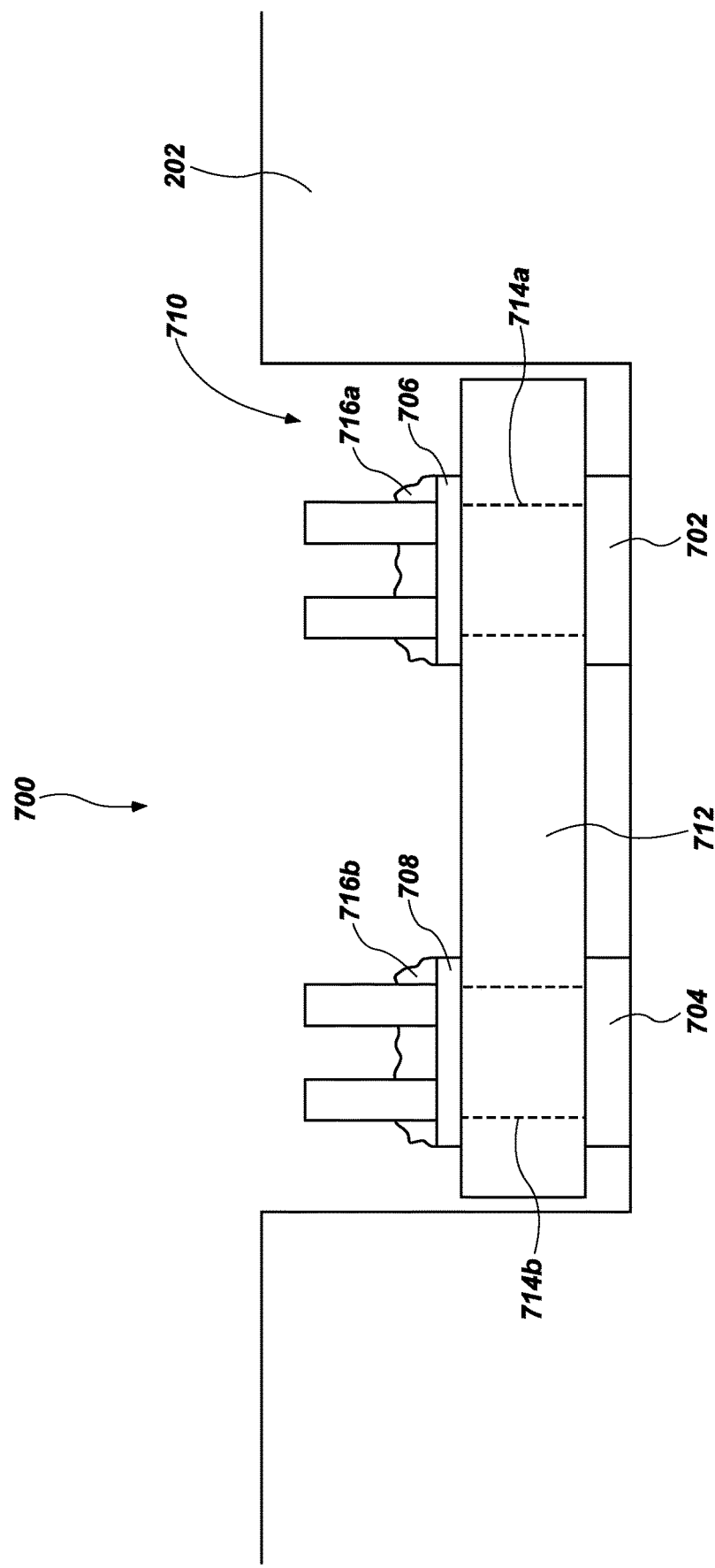
FIG. 7 is a schematic side view of a sensor-securing system according to another embodiment of the present disclosure.

FIG. 7 shows a schematic side view of a sensor-securing system 700 according to another embodiment of the present disclosure. In some embodiments, the sensor-securing system 700 may include a first post 702, a second post 704, a first retainer element 706, and a second retainer element 708. The first post 702 and the second post 704 may be disposed within a recess 710 formed in the bit body 202 of the drill bit 200 (FIG. 2). Furthermore, the first post 702 and second post 704 may extend in a direction at least substantially perpendicular to an outer surface of the bity body 202 of the drill bit 200 (FIG. 2).

In use, a sensor 712 may be disposed on the first and second posts 702, 704. For instance, the first and second posts 702, 704 may extend through correlating apertures 714a, 714b in the sensor 712. Additionally, the first and second retainer elements 706, 708 (e.g., washers, nuts, etc.) may be disposed over the sensor 712 on the first and second posts 702, 704. Furthermore, tack welds 716a, 716b may be formed on the first and second posts 702, 704 tacking the first and second retainer elements 706, 708 to the first and second posts 702, 704 and securing the sensor 712 to the first and second posts 702, 704. Attaching the sensor 712 to the bit body 202 via first and second posts 702, 704 and first and second retainer elements 706, 708 may enable sensors to be secured to two different discrete locations of the bit body 202 of the drill bit 200 (FIG. 2) in order to minimize distortion in measurements. Furthermore, attaching the sensor 712 to the bit body 202 via first and second posts 702, 704 and first and second retainer elements 706, 708 may allow sensors to be easily removed and replaced if a sensor is damaged during a drilling process. For instance, the sensor 712 may be removed by merely removing the tack welds on the first and second retainer elements 706, 708.

Figure 8A:
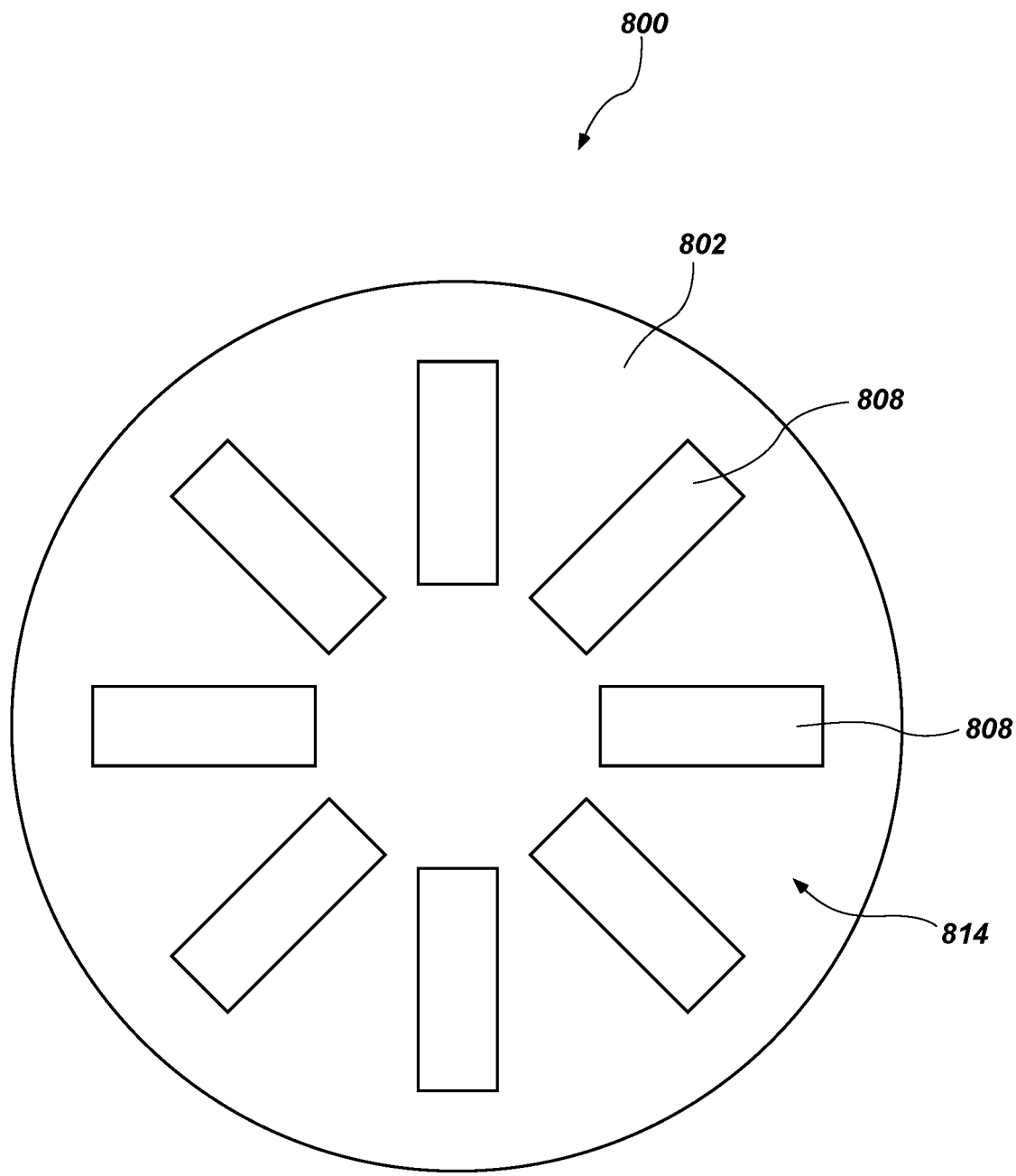
FIG. 8A is a schematic side view cap portion including a sensor substrate with a layout of a sensor-securing system that can be utilized to measure force, torsion, bending, etc., according to another embodiment of the present disclosure.
Figure 8B:
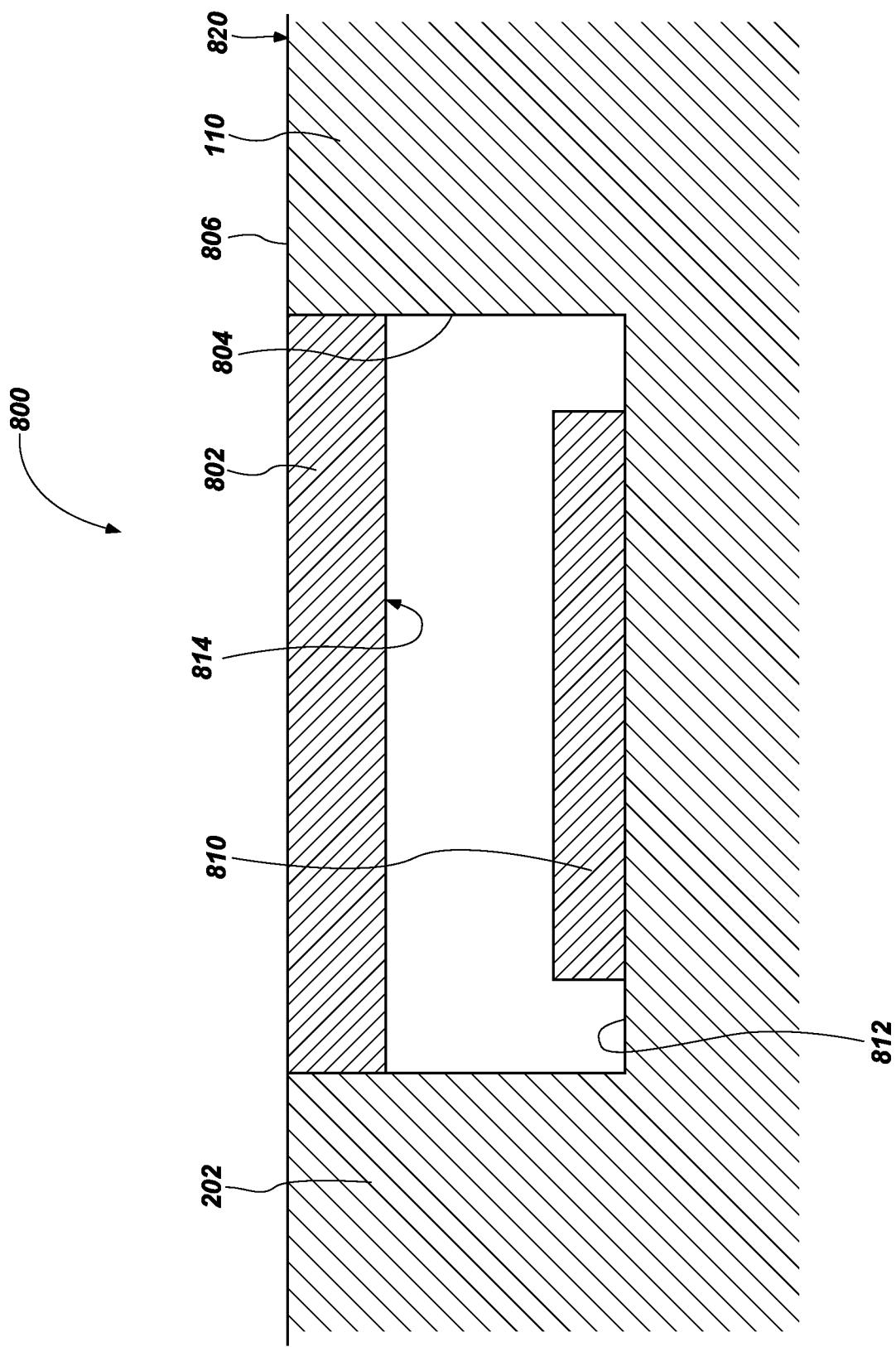
FIG. 8B is a side cross-sectional view of a recess of the sensor-securing system of FIG. 8A having the cap portion of FIG. 8A welded (e.g., electron beam welded) over the recess according to one or more embodiments of the present disclosure.

FIG. 8A shows a front view of a cap portion 802 of a sensor-securing system 800 according to one or more embodiments of the present disclosure. FIG. 8B shows a schematic view of a recess 804 formed in a wall 806 of a portion (e.g., a bit body 202) of a drill string 110. Referring to FIGS. 8A and 8B together, the sensor-securing system 800 may include the recess 804, the cap portion 802, one or more strain gauges 808 secured to cap portion 802, and one or more sensors 810 disposed within the recess 804 and attached to a base 812 of the recess 804. As will be discussed in greater detail below, a combination of the one or more strain gauges 808 and the one or more sensors 810 may be utilized to determine WOB, TOB, pressure, bending, vibration, and/or temperature.

In some embodiments, the cap portion 802 may be sized and shaped to fit within the recess 804 and to at least substantially cover the recess 804. For instance, the cap portion 802 may be welded over the recess 804 (e.g., electron beam welded). In additional embodiments, the cap portion 802 may be secured over the recess 804 via one or more fasteners (e.g., screws). Additionally, the one or more strain gauges 808 may be secured to an inner surface 814 of the cap portion 802 (e.g., a surface of the cap portion 802 facing an interior of the recess 804 when the cap portion 802 is covering the recess 804). In one or more embodiments, the one or more stain gauges 808 may include a plurality of strain gauges 808, and the plurality of strain gauges 808 may be oriented relative to one another in an array. For instance, the plurality of stain gauges 808 may be oriented within a pattern such that each strain gauge 808 extends radially outward from a center region of the cap portion 802. For example, the plurality of strain gauges 808 may form a sunburst pattern.

In one or more embodiments, the one or more strain gauges 808 may include a sputtered or thin film strain gauge 808. "Thin film" generally refers to one or more layers of a material having a thickness in the range of fractions of a nanometer to several micrometers. For instance, the one or more strain gauges 808 may be directly deposited on the inner surface 814 of the cap portion 802 via, e.g., sputtering or other forms of deposition. For example, the one or more strain gauges 808 may include any of the sputtered strain gauges described in U.S. Pat. No. 9,057,247, to Kumar et al., filed Feb. 21, 2012, issued Jun. 16, 2015, U.S. Pat. No. 9,372,124, to Schlosser, filed Jan. 10, 2012, issued Jun. 21, 2016, or U.S. Pat. No. 9,784,099, to Kale et al., filed Dec. 18, 2013, issued Oct. 10, 2017, the disclosures of each of which are incorporated in their entireties by reference herein. For example, FIG. 8A shows an example of a strain gauge 808 sputtered or otherwise deposited directly onto the inner surface 814 of the cap portion 802. In some embodiments, the one or more strain gauges 808 may be a thin film deposited foil strain gauge 808. Additionally, the one or more strain gauges 808 may include conductors that are deposited directly onto the cap portion 802 to measure the stress/strain the cap portion 802 is undergoing during operation. Gauge leads may be connected to the ends of the conductors.

In some embodiments, the one or more strain gauges 808 may be deposited directly on the cap portion 802 such that it is in direct contact with the inner surface 814 of the cap portion 802. Any of a number of various deposition techniques may be used to deposit the strain gauge 808, such as sputtering, evaporation, chemical vapor deposition, laser deposition, injection printing, screen printing, ink jet printing, lithographic patterning, electroplating and others. Although the one or more strain gauges 808 are described herein as deposited onto the inner surface 814 of the cap portion 802, the one or more strain gauges 808 may also be applied to the inner surface 814 of the cap portion 802 using other techniques or mechanisms, such as gluing the strain gauge 808 onto the inner surface 814 of the cap portion 802 (e.g., adhered via a thermal flame spray or ceramic cement).

In one or more embodiments, the one or more strain gauges 808 may be utilized to measure strain, and also to detect and/or monitor crack formation. For example, the one or more strain gauges 808 can be used to detect the formation and/or growth of a crack or other discontinuity that may form on a wall of the bit body 202. For example, as a crack develops under the one or more strain gauges 808, the one or more strain gauges 808 may crack as well (or otherwise deform), which causes a signal produced by the one or more strain gauges 808 to indicate a change in resistance or to be cut off entirely, indicating that a crack has formed. Other conditions that can be monitored include abrasion and/or erosion of the bit body 202, outer layers of a component or protective coatings, which can exert strain on the one or more gauges and/or cut off a gauge circuit.

In some instances, the one or more strain gauges 808 include one or more resistive traces configured to change resistance due to breach of a trace by a crack. In another example, the strain gauge 808 includes an ultrasonic transducer including an ultrasonic wave source and one or more ultrasonic detection (e.g., piezoelectric) traces configured to detect changes in wave propagation that occur due to a modified surface (e.g., through erosion, abrasion, crack formation and/or crack propagation). The traces may be configured as one or more elongated traces or an array covering a selected area of the surface.

In some embodiments, one or more protective layers may be disposed over the one or more strain gauges 808. The protective layer may be, for example, a polymer or epoxy material, a metallic material, a ceramic material, a ceramic cement, a thermal flame spray, or any other suitable material configured to withstand temperatures found in a downhole environment. In some instances, the one or more strain gauges 808 may include a deposited conductor, made from a conductive material such as a metallic material (e.g., aluminum or Nichrome) or graphite. For example, the conductor may be formed on the inner surface 814 of the cap portion 802 by directly depositing strain sensitive materials such as NiCr or CuNi. Other examples of suitable strain sensitive materials also include nickel containing diamond like carbon films and Ag-ITO compounds. However, the one or more strain gauges 808 are not so limited, and can be made from any suitable material or include any mechanism sufficient generate a signal indicative of strain on a surface or within a component material or layer.

In some embodiments, the one or more strain gauges 808 may include a piezoelectric material that is directly deposited on the inner surface 814 of the cap portion 802 using, e.g., sputtering or screen printing techniques. For example, piezoelectric materials formed as part of, e.g., ultrasonic transducers, can be directly patterned on the inner surface 814 of the cap portion 802 and used to detect crack propagation. If the inner surface 814 of the cap portion 802 is non-conductive (e.g., a composite material), the piezoelectric material can be integrated in a surface material of the inner surface 814 of the cap portion 802, e.g., in the form of fibers. In additional embodiments, the one or more strain gauges 808 may include a platinum alloy strain gauge, a tungsten alloy strain gauge, or a semiconductor strain gauge (e.g., P-doped bulk silicon). When the one or more strain gauges 808 do not include a sputtered strain gauge, the one or more strain gauges 808 may be secured to the cap portion 802 via one or more of a ceramic cement or thermal flame spray.

Additionally, in one or more embodiments, the one or more sensors 810 disposed within the recess 804 and attached to a base 812 of the recess 804 may include weldable sensors. In some embodiments, the one or more sensors 810 may be welded directly to the base 812 of the recess 804. For instance, the one or more sensors 810 may include any of the weldable sensors described above in regard to FIGS. 3A-7. As a result, any reliability problems with attaching sensors via other methods other than welding are eliminated. Additionally, the one or more sensors 810 may include any of the sensors described above in regard to FIGS. 3A-7. In one or more embodiments, the one or more sensors 810 may include a WOB sensor and/or TOB sensor.

Because the cap portion 802 is disposed within the recess 804, the sensor-securing system 800 exhibits a low profile relative to an outer surface 820 of the drill string 110. As a result, the sensor-securing system 800 may avoid catching on a formation and/or debris during a drilling operation. The foregoing may lead to longer lifespans and cost savings relative to conventional sensor(s) securing methods. Additionally, as discussed above, the sensor-securing system 800 may be disposed within a recess 804 formed on any component of a drill string 110 (e.g., shanks, blades, subs, pipes, or any other component).

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed is:

1. An earth-boring tool, comprising:
 a body having a shank secured thereto, the shank having a central bore extending through the shank;
 an end-cap at least partially disposed within the central bore of the shank and comprising:
  a first flange;
  a second flange; and
  a body portion extending between the first flange and the second flange and comprising a cap bore extending through the body portion along a longitudinal length of the body portion, wherein an annular chamber is defined between the body portion of the end-cap and an interior wall of the central bore of the shank; and
 at least one strain gauge secured to an outer surface of the body portion of the end-cap, wherein the at least one strain gauge is configured to measure strains caused by a pressure differential between pressure within the cap bore of the body portion and pressure within the annular chamber.

2. The earth-boring tool of claim 1, wherein the at least one strain gauge comprises a piezoelectric gauge.

3. The earth-boring tool of claim 1, wherein the at least one strain gauge comprises a plurality of strain gauges, and wherein each strain gauge of the plurality of strain gauges is secured to the outer surface of the body portion of the end-cap.

4. The earth-boring tool of claim 1, further comprising another strain gauge secured to another portion of the drill bit.

5. The earth-boring tool of claim 1, wherein the at least one strain gauge is secured to the outer surface of the body portion of the end-cap via an adhesive.

6. The earth-boring tool of claim 1, wherein the at least one strain gauge is secured to the outer surface of the body portion of the end-cap via a ceramic cement.

7. An earth-boring tool, comprising:
 a body;
 a recess formed in a wall of the body;

a sensor-securing system disposed within the recess and comprising:
  a first wedge member disposed within the recess and comprising a shallow valley formed in a lateral side of the first wedge member;
  a second wedge member disposed within the recess and adjacent to the first wedge member, wherein the first wedge member and the second wedge member define a first tapered aperture and a second tapered aperture;
  a first tapered fastener disposed within the first tapered aperture; and
  a second tapered fastener disposed within the second tapered aperture, wherein the first and second wedge members are configured to separate when the first and second tapered fasteners are tightened; and
  a sensor disposed between the first wedge member and a sidewall of the recess, and wherein the shallow valley of the first wedge member is configured to abut up against the sensor.

8. The earth-boring tool of claim 7, wherein the recess comprises:
  a slanted lateral sidewall; and
  an opposite non-slanted lateral sidewall.

9. The earth-boring tool of claim 8, wherein the second wedge member comprises a slanted lateral side that correlates to the slanted lateral sidewall of the recess and is configured to fit up against the slanted lateral sidewall.

10. The earth-boring tool of claim 7, wherein a first lateral half of the first tapered aperture is defined by the first wedge member, and wherein a second lateral half of the first tapered aperture is defined by the second wedge member.

11. The earth-boring tool of claim 7, wherein a first lateral half of the second tapered aperture is defined by the first wedge member, and wherein a second lateral half of the second tapered aperture is defined by the second wedge member.

12. The earth-boring tool of claim 7, further comprising a central aperture defined by the first wedge member and the second wedge member.

13. An earth-boring tool, comprising:
  a body;
  a recess formed in a wall of the body;
  a cap portion disposed within the recess, the cap portion comprising at least one sputtered strain gauge formed on an inner surface of the cap portion; and
  a sensor disposed within the recess between a base of the recess and the inner surface of the cap portion.

14. The earth-boring tool of claim 13, wherein the at least one sputtered strain gauge comprises a plurality of sputtered strain gauges extending radially outward from a center point of the cap portion.

15. The earth-boring tool of claim 13, wherein the cap portion is electron beam welded over the recess.

16. The earth-boring tool of claim 13, wherein the sensor comprises at least one of a temperature sensor, a pressure sensor, a torque sensor, or an accelerometer.

17. The earth-boring tool of claim 13, wherein the sensor is secured to the base of the recess via an adhesive.

18. The earth-boring tool of claim 13, further comprising a piezoelectric strain gauge disposed on the inner surface of the cap portion.

* * * * *